(12) United States Patent
Sohn et al.

(10) Patent No.: US 10,527,772 B2
(45) Date of Patent: Jan. 7, 2020

(54) DISPLAY DEVICE

(71) Applicant: SAMSUNG ELECTRONICS CO., LTD., Suwon-si (KR)

(72) Inventors: Sang Hyun Sohn, Suwon-si (KR); Joon Seok Ahn, Suwon-si (KR); Dae Hee Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/797,332

(22) Filed: Oct. 30, 2017

(65) Prior Publication Data

US 2018/0172894 A1 Jun. 21, 2018

(30) Foreign Application Priority Data

Dec. 19, 2016 (KR) .......................... 10-2016-0173743

(51) Int. Cl.
*F21V 8/00* (2006.01)

(52) U.S. Cl.
CPC ............ *G02B 6/0026* (2013.01); *G02B 6/009* (2013.01); *G02B 6/0025* (2013.01); *G02B 6/0031* (2013.01); *G02B 6/0055* (2013.01); *G02B 6/0085* (2013.01); *G02B 6/0088* (2013.01)

(58) Field of Classification Search
None
See application file for complete search history.

(56) References Cited

U.S. PATENT DOCUMENTS

| 8,164,825 B2 * | 4/2012 | Narendran ............ H01L 33/507 359/326 |
| 2012/0113354 A1 * | 5/2012 | Park .................. G02F 1/133606 349/62 |
| 2012/0250351 A1 | 10/2012 | Shin et al. |
| 2013/0050616 A1 * | 2/2013 | Seo .................... G02F 1/133603 349/71 |

(Continued)

FOREIGN PATENT DOCUMENTS

| JP | 2005-93681 A | 4/2005 |
| JP | 2015-106487 A | 6/2015 |

(Continued)

OTHER PUBLICATIONS

Communication dated Feb. 27, 2018 by the International Searching Authority in counterpart International Patent Application No. PCT/KR2017/012600. (PCT/ISA/210).

*Primary Examiner* — Elmito Breval
(74) *Attorney, Agent, or Firm* — Sughrue Mion, PLLC

(57) ABSTRACT

A display device includes a display panel; at least one light source package configured to emit light; and a light guide plate configured to receive the light emitted by the light source package and guide the light toward the display panel, wherein the at least one light source package includes: a light source configured to emit the light; a light converter disposed between the light source and the light guide plate, and configured to convert one or more properties of the light emitted by the light source; and a package housing in which the light source is disposed and including one side with an opening in which the light converter is disposed, the package housing including a unit support surface configured to support a side surface of the light converter.

15 Claims, 10 Drawing Sheets

(56) References Cited

U.S. PATENT DOCUMENTS

| | | | |
|---|---|---|---|
| 2013/0271700 A1* | 10/2013 | Nakamura | G02B 6/0026 349/65 |
| 2014/0009820 A1* | 1/2014 | Park | G02F 1/353 359/326 |
| 2014/0233212 A1* | 8/2014 | Park | G02F 1/133606 362/84 |
| 2015/0219288 A1* | 8/2015 | An | H01L 33/44 362/293 |
| 2015/0270455 A1 | 9/2015 | Naasani et al. | |

FOREIGN PATENT DOCUMENTS

| | | |
|---|---|---|
| KR | 10-2012-0011253 A | 2/2012 |
| KR | 10-2012-0092888 A | 8/2012 |
| KR | 10-2014-0129764 A | 11/2014 |
| KR | 10-2014-0132301 A | 11/2014 |
| KR | 10-2015-0029869 A | 3/2015 |
| KR | 10-2015-0070851 A | 6/2015 |
| WO | 2011/033406 A2 | 3/2011 |

\* cited by examiner

DISPLAY DEVICE

CROSS-REFERENCE TO RELATED APPLICATION(S)

This application claims the priority from Korean Patent Application No. 10-2016-0173743, filed on Dec. 19, 2016, in the Korean Intellectual Property Office, the disclosure of which is incorporated herein by reference.

BACKGROUND

1. Technical Field

Example embodiments of the present disclosure relate to a display device, and more particularly, to a display device having improved light concentration efficiency.

2. Description of the Related Art

In general, display devices are devices which display an image on a screen. Examples of display devices include monitors and television sets. A display device may include self-luminous display panels such as organic light emitting diode (OLED) panels, or light-receiving display panels such as liquid crystal display (LCD) panels.

A display device which utilizes the light-receiving display panel may include a display panel formed with an LCD and in which a screen is displayed, and a backlight unit to supply light to the display panel. The backlight unit may include a light source module having a light source, a light guide plate that receives light from the light source and emits light to the display panel, and a plurality of optical sheets through which light emitted from the light guide plate passes. The optical sheets may include a reflective sheet, a diffusion sheet, a prism sheet, a polarizing sheet, or the like.

As described above, light generated from the light source may be directed to the display panel through the light guide plate. However, since the light generated from the light source is not emitted in a certain direction but may be emitted in all directions to a periphery of the light guide plate, the light concentration efficiency may be deteriorated. As the light concentration efficiency deteriorates, additional problems such as the need to unnecessarily increase the intensity of light in order to match the amount of light required, or the need to dissipate heat because a large amount of heat is generated from the light source may arise.

SUMMARY

One or more example embodiments provide a display device configured to improve the light concentration efficiency of a light source, improve color reproducibility, and/or reduce or minimize an external influence.

One or more example embodiments also provide a display device having a structure to improve color reproducibility.

One or more example embodiments also provide a display device that minimizes an external influence on quantum dots.

According to an aspect of an example embodiment, there is provided a display device including: a display panel; at least one light source package configured to emit light; and a light guide plate configured to receive the light emitted by the light source package and guide the light toward the display panel, wherein the at least one light source package includes: a light source configured to emit the light; a light converter disposed between the light source and the light guide plate, and configured to convert one or more properties of the light emitted by the light source, the light converter including a first surface on which the light emitted by the light source is incident and a second surface opposite to the first surface and from which the light incident on the first surface is emitted toward the light guide plate; and a package housing in which the light source is disposed and including one side with an opening in which the light converter is disposed, the package housing including a unit support surface configured to support a side surface of the light converter connecting the first surface and the second surface of the light converter.

The at least one light source package may further include a unit reflection layer configured to reflect light and disposed between the side surface of the light converter and the unit support surface of the package housing.

The unit reflection layer may be integrally formed with at least one of the light converter and the package housing.

The light converter may include: a quantum dot (QD); and a unit body configured to transmit light and including an inner wall to form a receiving portion in which the quantum dot is disposed and sealed.

The at least one light source package may further include a QD reflection layer disposed along the inner wall of the unit body and configured to reflect at least one of the light emitted by the light source and light reflected from the quantum dot.

The unit body may further include: a first body; a second body spaced apart from the first body: and a reflective body configured to be in contact with the first body and the second body and disposed between the first body and the second body to form the receiving portion, the reflective body including an outer surface configured to reflect light.

Each of the side surface of the light converter and the unit support surface may include a flat surface parallel to a direction normal to a surface of the light guide plate.

The package housing may further include a seat surface extending from the unit support surface and on which at least a portion of the first surface of the light converter is disposed.

The package housing further may include a reflecting cup portion connected to the seat surface, disposed at an angle from an inner surface of the package housing, and configured to reflect the light emitted from the light source.

At least one of the first surface and the second surface of the light converter may be an uneven surface configured to reduce reflection of light.

The at least one light source package may further include a prism disposed on one of the first surface and the second surface of the light converter, and configured to concentrate light emitted from the light source toward the light guide plate.

The at least one light source package may further include a dichroic filter disposed on the first surface of the light converter and configured to reflect light, reflected toward the light source by the light converter, toward the light guide plate.

According to an aspect of another example embodiment, there is provided display device including: a display panel; a light source package configured to emit light; and a light guide plate configured to receive the light emitted by the light source and configured to guide the light toward the display panel, wherein the light source package includes: a package housing including one side with an opening opposite to the light guide plate; a light source disposed inside the package housing and configured to emit the light; and a light converter configured to convert one or more properties of the light emitted from the light source, and including a first surface on which the light emitted by the light source is incident, and a second surface opposite to the light guide plate and exposed to the light guide plate through the opening of the package housing.

The package housing may include a unit support surface configured to support a side surface of the light converter connecting the first surface and the second surface of the light converter, and the light source package may further include a unit reflection layer configured to reflect light and disposed between the side surface of the light converter and the unit support surface.

The unit reflection layer may be integrally formed with at least one of the light converter and the package housing.

The light converter may include a quantum dot (QD), and a unit body including an inner wall configured to form a receiving portion in which the quantum dot, configured to be light transmissible, is disposed and sealed.

The light source package may further include a QD reflection layer disposed along the inner wall of the unit body and configured to reflect at least one of the light emitted from the light source and light reflected from the QD.

The unit body may further include: a first body; a second body spaced apart from the first body; and a reflective body configured to be in contact with the first body and the second body and disposed between the first body and the second body to form the receiving portion, the reflective body including an outer surface configured to reflect light.

According to an aspect of another example embodiment, there is provided a display device including: a display panel; a light source package configured to emit light; and a light guide plate to receive the light emitted by the light source package and transmit the light to the display panel, wherein the light source package includes; a light source configured to emit the light; a light converter disposed between the light source and the light guide plate to convert one or more properties of the light emitted by the light source; a package housing in which the light source and the light converter are disposed; and a reflection layer disposed on an inner surface of the package housing and configured to reflect light.

The reflection layer may be integrally formed with at least one of the light converter and the package housing.

BRIEF DESCRIPTION OF THE DRAWINGS

The above and/or other aspects will become apparent and more readily appreciated from the following detailed description of example embodiments, taken in conjunction with the accompanying drawings, in which like reference numerals refer to like elements, and wherein.

DETAILED DESCRIPTION

Figure 1:
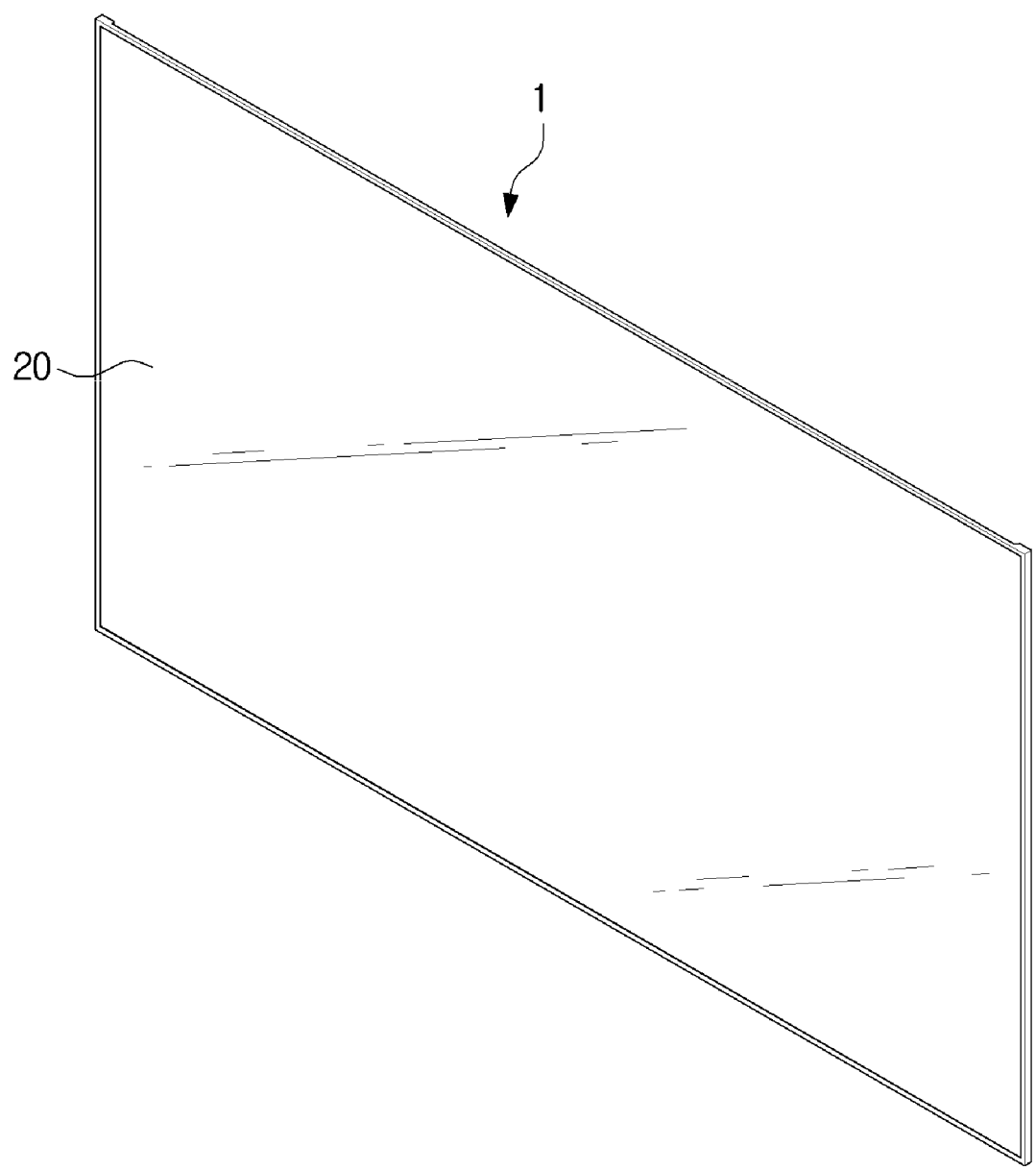
FIG. 1 is a perspective view of a display device according to an example embodiment.

Hereinafter, various example embodiments of the present disclosure will be described in greater detail with reference to the accompanying drawings. These example embodiments are described in sufficient detail to enable those skilled in the art to practice the inventive concept, and it is to be understood that the example embodiments are not intended to limit the present disclosure to particular modes of practice, and it is to be appreciated that all modification, equivalents, and alternatives that do not depart from the spirit and technical scope of the present disclosure are encompassed in the present disclosure.

In addition, like reference numerals or symbols shown in the drawings of the present disclosure indicate components or components that perform substantially the same function.

Throughout the disclosure, the terms used are merely used to describe example embodiments, and are not intended to limit the present disclosure. As used herein, the singular forms "a," "an" and "the" are intended to include the plural forms as well, unless the context clearly indicates otherwise. Also, it is to be understood that the terms such as "include," "have," etc., are intended to indicate the existence of the features, numbers, operations, components, parts, or combinations thereof disclosed in the disclosure, and are not intended to preclude the possibility that one or more other features, numbers, operations, components, parts, or combinations thereof may exist or may be added.

The terms used in the present specification are used for the purpose of describing the example embodiments, and not for the purpose of limiting and/or restricting the present disclosure.

Terms including ordinals such as "first," "second" and the like used herein may be used to describe various elements, but the elements are not limited to the terms, and it is used only for the purpose of distinguishing one component from another. For example, the first component may be referred to as a second component, and similarly, the second component may also be referred to as a first component. The term "and/or" includes any combination of a plurality of related listed items or any of the plurality of related listed items.

Also, the terms such as "front side" and "front surface" are defined based on the front surface of a display panel on which images are displayed in a display device shown in FIG. 1. The terms such as "rear side" and "rear surface" are defined as the opposite direction or surface of the "front side" and "front surface."

Also, terms such as "upper edge," "lower edge," "side edge," "peripheral edge," etc., which are used in the following description are defined based on example embodiments as shown in the drawings, but a shape and a position of each component are not limited thereto.

Figure 2:
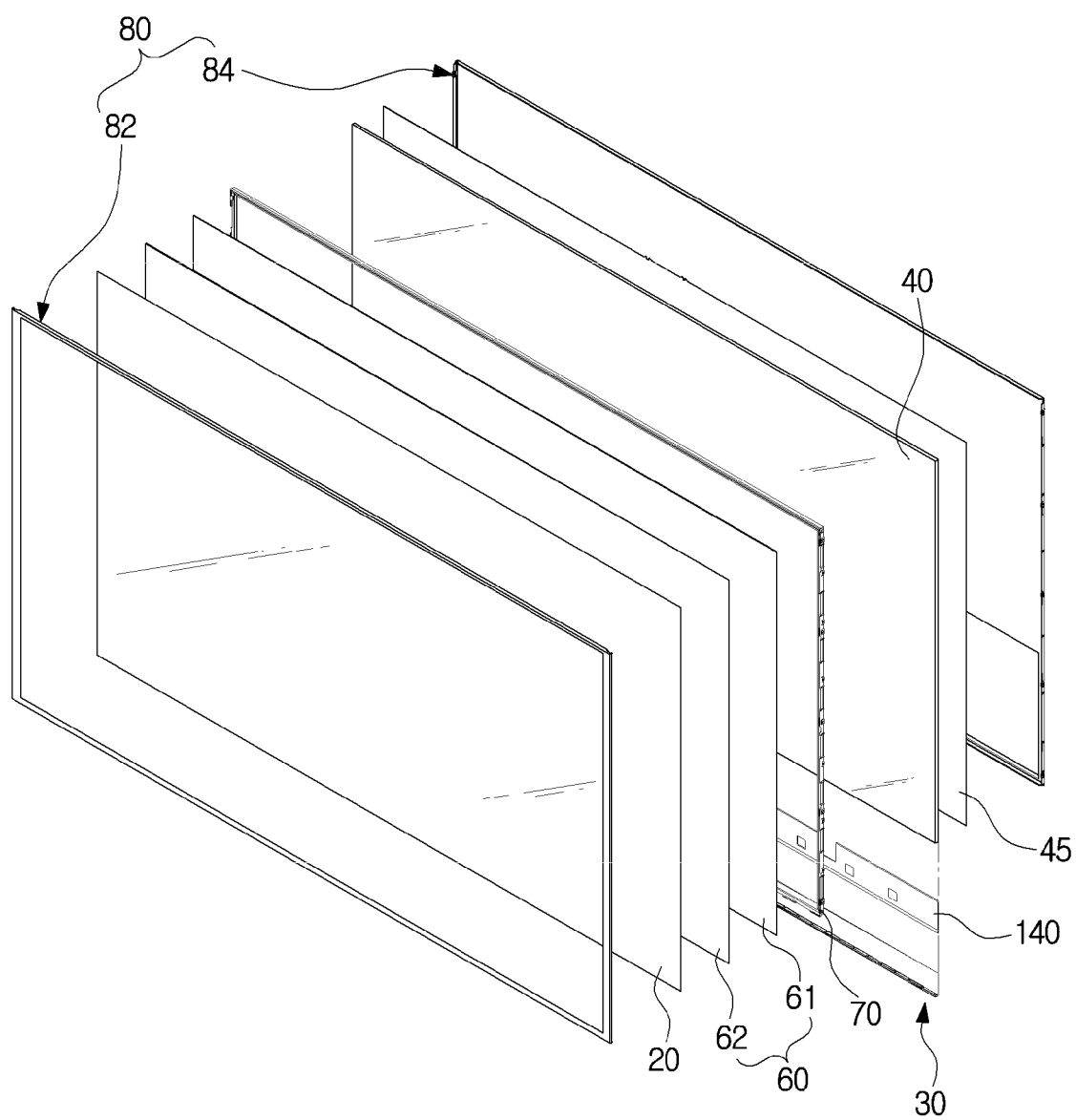
FIG. 2 is an exploded perspective view of a display device according to an example embodiment.
Figure 3:
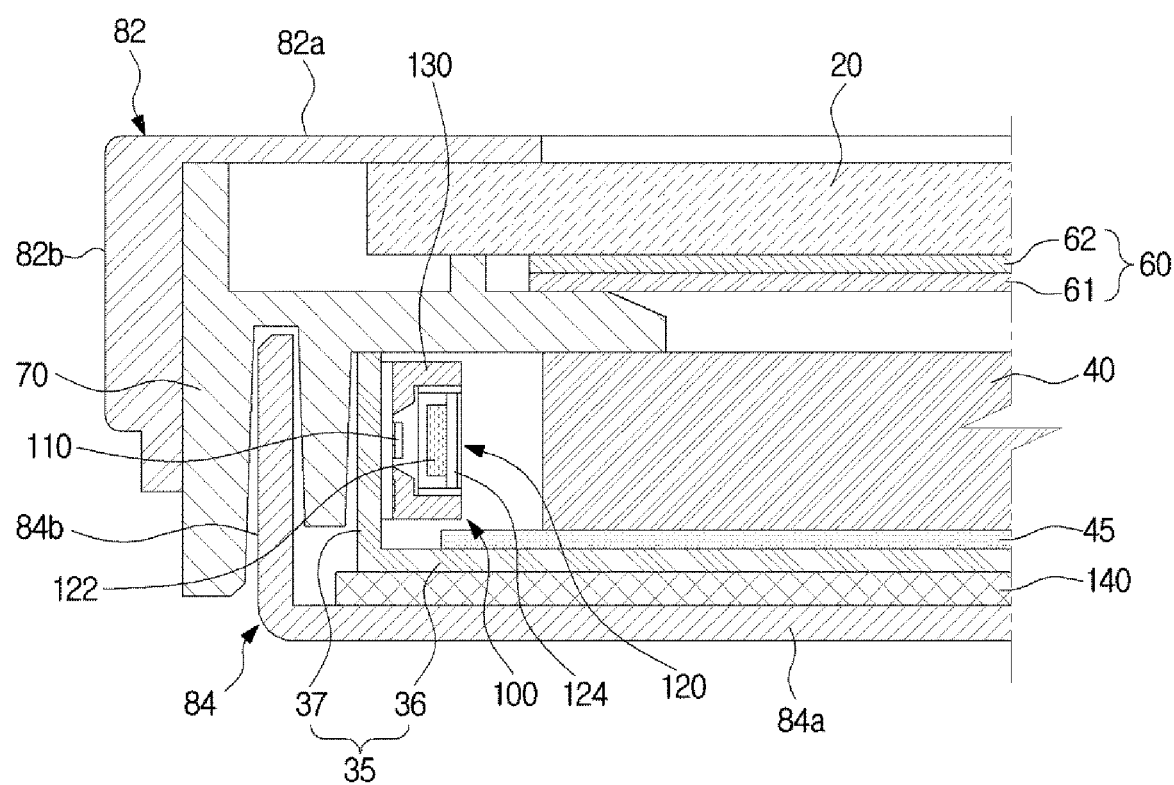
FIG. 3 is a cross-sectional view of a display device according to an example embodiment.

FIG. 1 is a perspective view of a display device according to an example embodiment, FIG. 2 is an exploded perspective view of a display device according to an example embodiment, and FIG. 3 is a cross-sectional view of a display device according to an example embodiment.

The display device 1 may be a flat display device, as shown in FIG. 1. However, embodiments are not limited thereto. The display device may be, for example, a curved display device or a bendable display device.

The display device 1 includes a display module for displaying an image therein.

The display module includes a display panel 20 on which an image is displayed and a backlight unit that emits light to the display panel 20. The backlight unit may include a light source module 30 and optical sheets 60. The backlight unit may include the light source module 30 disposed at a rear side of the display panel 20, a light guide plate 40 that is disposed in a space between the display panel 20 and the light source module 30 and configured to transmit light emitted from the light source module 30 located on the rear side of the light guide plate 40 to the display panel 20 located on the front side of the light guide plate 40, optical sheets 60 disposed between the light guide plate 40 and the display panel 20 configured to change the optical properties of light passing through the optical sheets 60, a middle mold 70 to support the display panel 20 and the light guide plate 40, and a display chassis 80 that forms an outer appearance of the display device 1. The display chassis 80 may include a top chassis 82 coupled to a front side of the middle mold 70 to maintain the state in which the display panel 20 is installed on the middle mold 70, and a bottom chassis 84 coupled to a rear side of the middle mold 70.

The light source module 30 may be disposed inside the bottom chassis 84 and may emit light toward the inner center of the bottom chassis 84. In an example embodiment, the light source module 30 may be disposed at a lower edge of the display module. However, embodiments are not limited thereto. For example, the light source module 30 may be disposed at one or more of a lower edge, a side edge, and an upper edge of the display module, or may be disposed along the peripheral edge of the display module. A light source module may also be a direct type disposed directly on the rear surface of the display panel 20.

On the front side of the middle mold 70, the display panel 20 and the top chassis 82 are disposed and on the rear side of the middle mold 70, the bottom chassis 84 is disposed so that the middle mold 70 supports the respective components and maintains the display panel 20 and the bottom chassis 84 spaced apart from each other.

As shown in FIG. 3, the top chassis 82 may include a bezel portion 82a covering the front peripheral edge of the display panel 20 and a front side portion 82b bent rearward from the periphery of the bezel portion 82a to cover a side surface of the middle mold 70.

The bottom chassis 84 includes a rear portion 84a that forms a rear surface of the display module, and a bottom side portion 84b that is bent forward from the periphery of the rear portion 84a and is coupled to the middle mold 70.

The light source module 30 may include a light source package 100 and a printed circuit board 35.

The light source package 100 may include a light source 110 and a light converter 120. The light source 110 may include one or more light emitting diodes (LEDs). A plurality of the light sources 110 may be disposed in the light source package 100, and may be spaced apart from each other at a predetermined interval. A plurality of the light source packages 100 may be disposed on the printed circuit board (PCB) to be spaced apart from each other. The light source 110 may include, for example, a blue LED.

The light guide plate 40 may be disposed to be spaced apart from the bottom chassis 84 to enable the light source 110 to be disposed at opposite side edges of the space between the light guide plate 40 and the bottom side portion 84b of the bottom chassis 84.

The light guide plate 40 may include a reflective member 45 on the rear surface thereof. The reflective member 45 may be disposed on the rear surface of the light guide plate 40 and configured to direct substantially all light emitted from the light source module 30 toward the front surface of the light guide plate 40. The reflective member 45 may be formed as a reflective plate separately from the light guide plate 40 and disposed on the rear surface of the light guide plate 40 or may be integrally formed with the light guide plate 40. Further, by coating the rear surface of the light guide plate 40 with reflective material, the same or similar effect as the above effect may be obtained.

The light guide plate 40 is configured to transmit light emitted from the light source module 30 to the display panel 20. The light guide plate 40 may be formed of, for example, a transparent resin material. The light guide plate 40 may be spaced apart from the light source module 30 by a predetermined distance to reduce deformation due to the heat generated from the light source module 30.

Figure 4:
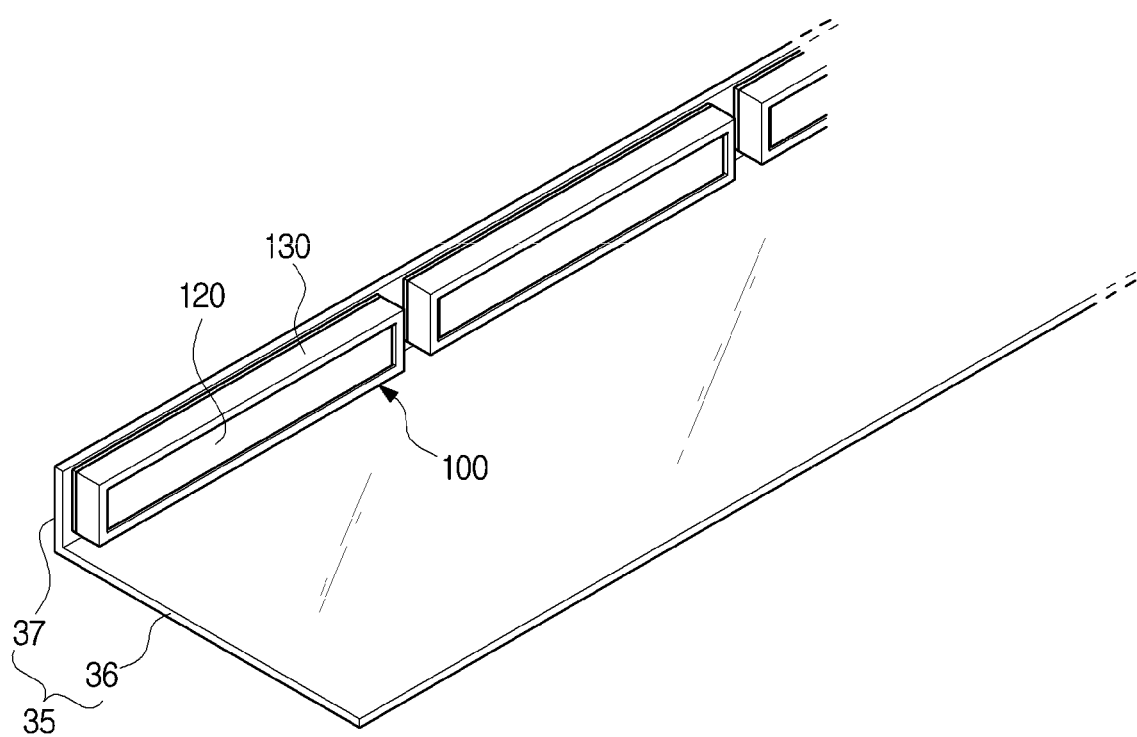
FIG. 4 is a perspective view of a light source module of a display device according to an example embodiment.
Figure 5:
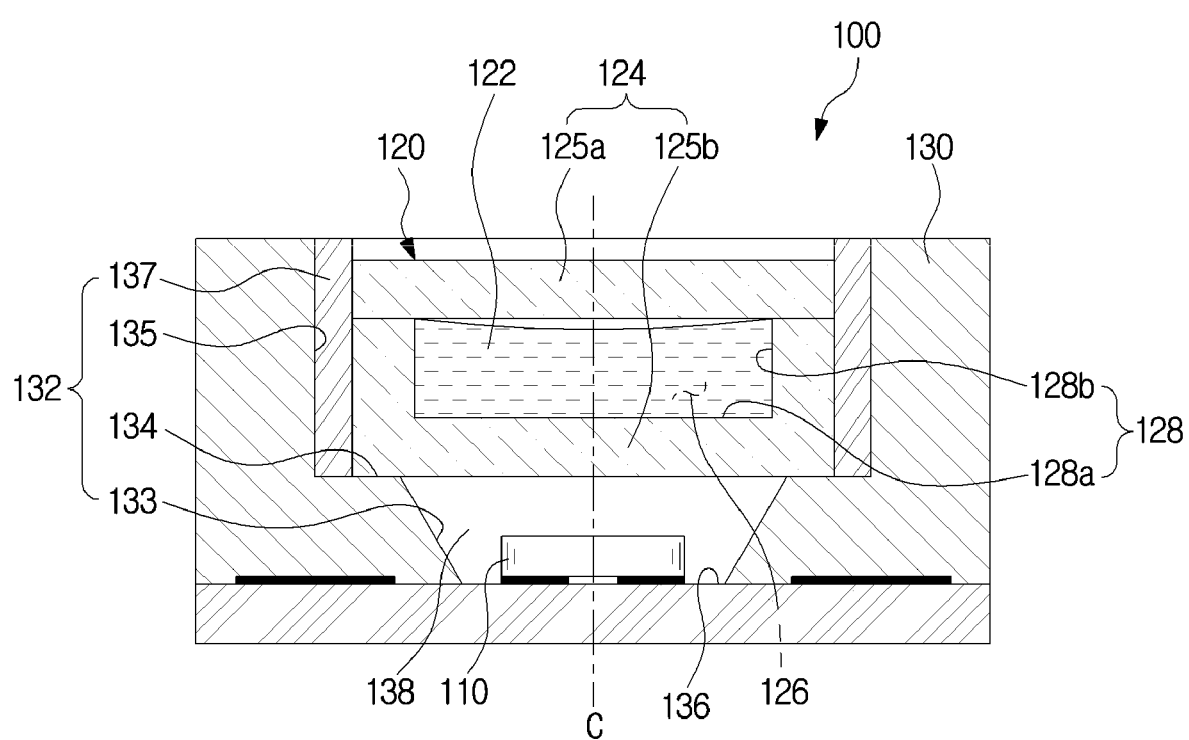
FIG. 5 is a cross-sectional view of a light source package of a display device according to an example embodiment.

FIG. 4 is a perspective view of the light source module 30 of the display device according to an example embodiment, and FIG. 5 is a cross-sectional view of the light source package 100 of a display device according to an example embodiment.

As shown in FIG. 4, one or more light source packages 100 may be disposed on the printed circuit board 35 to be spaced apart from each other.

As shown in FIG. 5, the light source package 100 may include the light source 110 and the light converter 120. The light converter 120 may be disposed between the light source 110 and the light guide plate 40 to convert one or more property of light emitted from the light source 110 to the light guide plate 40.

For example, the light converter 120 may be configured to convert the wavelength of light emitted from the light source 110 to the light guide plate 40. The light converter 120 may have a first surface that faces the light source 110 and a second surface that faces the light guide plate 40.

The light converter 120 may include a quantum dot (QD) 122 and a unit body 124 surrounding the quantum dot 122. The unit body 124 forms a receiving portion 126 therein and the quantum dot 122 may be disposed in the receiving portion. The receiving portion 126 of the unit body 124 may be formed to be hermetically closed, and the quantum dot 122 may be disposed in the closed space. Such configuration may reduce or prevent the quantum dot 122 from being exposed to the external environment, and thereby, may reduce or prevent the quantum dot 122 from being oxidized or deformed by moisture.

The unit body 124 may be formed of a light transmissive material to transmit light.

The unit body 124 may include a first body 125a and a second body 125b which is in close contact with the first body 125a and has a recessed surface opposite to the first body 125a to form the receiving portion 126. That is, the unit body 124 may be configured to seal the quantum dot 122 therein. The first and second bodies 125a and 125b may be in close contact with or coupled to each other such that the quantum dot 122 is not influenced from the external environment. The receiving portion 126 may be formed by an inner wall 128 of the unit body 124 formed concavely at the second body 125b.

According to an example embodiment, one surface of the second body 125b may be recessed, and the receiving portion 126 may be formed by the close contact or the coupling of the first and second bodies 125a and 125b. However, embodiments are not limited thereto. For example, the surfaces opposing each other in the first and second bodies 125a and 125b may be recessed, and the receiving portion 126 may be formed by the close contact or the coupling of the first and second bodies 125a and 125b. In addition, only the surface opposing the second body 125b in the first body 125a may be recessed, and form the receiving portion 126 by the close contact with or the coupling of the first and second bodies 125a and 125b.

Hereinafter, the quantum dot (QD) will be described. When electrons absorb energy, the electrons which are present in a valence band jump to a conduction band. Then the electrons lose the absorbed energy and return to the valence band, and at this time, the absorbed energy is radiated as light. The QD generates fluorescence with higher intensity at a narrower wave band. Different colors of visible light may be generated according to the size of the QD. In addition, since the QD itself generates a natural color, there may be no or less color loss, and thus, the QD may be a material of higher color reproducibility. When the size of a particle of the QD is smaller, light having a shorter wavelength may be generated, and when the particle of the QD is larger, light having a longer wavelength may be generated. The QD may be a compound such as cadmium selenide (CdSe), cadmium sulfide (CdS), cadmium telluride (CdTe), zinc selenide (ZnSe), zinc telluride (ZnTe), zinc sulfide (ZnS), etc.

The light source package 100 may include a package housing 130. The light source 110 and the light converter 120 may be disposed inside the package housing 130. The package housing 130 may be configured to absorb heat generated from the light source 110 and the light converter 120. To absorb heat, the package housing 130 may be configured to be in contact with the light source 110 and the light converter 120. The package housing 130 may be formed of a material having a higher heat transfer coefficient. The package housing 130 may be configured such that one side of the package housing 130 is opened toward the light guide plate 40.

The light source 110 may be disposed inside the package housing 130. The package housing 130 may be disposed on the printed circuit board 35. The package housing 130 may be disposed around the light source 110 and may be configured to reflect light emitted from the light source 110 to the light converter 120. That is, a reflection layer 132 for reflecting light may be disposed on the inner surface of the package housing 130. The reflection layer 132 may be configured to reflect light on the path of light emitted from the light source 110.

The reflection layer 132 may include a reflecting cup portion 133 configured to receive light emitted from the light source 110. The reflecting cup portion 133 may be formed to be inclined at an angle to reflect light. The angle of the reflection cup portion 133 is not limited to a specific angle and may be adapted such that the light reflected by the reflecting cup portion 133 is directed to the light converter 120. Between the reflecting cup portion 133 and the light converter 120, a sealing material 138 of a light transmitting material may be filled. The reflecting cup portion 133 may be formed on the inner surface of the package housing 130 and may include a bottom surface 136 on which the light source 110 is disposed.

The reflection layer 132 may include a seat surface 134 extending from the reflecting cup portion 133 and opposite to the light guide plate 40. One surface of the light converter 120 may be disposed on the seat surface 134 opposite to the light source 110.

The reflection layer 132 may include a unit support surface 135. The unit support surface 135 is provided so as to face a side surface connecting the first surface and the second surface of the light converter 120. The unit support surface 135 may be configured to support the side surface of the light converter 120. The package housing 130 is configured to support the light converter 120 through the unit support surface 135 and to limit the path of light emitted from the light source 110. That is, since the package housing 130 is disposed along the side surface of the light converter 120, it is possible to restrict light emitted from the light source 110 from being directed to the periphery of the light source package 100 and not the light guide plate 40.

The light source package 100 may include a unit reflection layer 137. The unit reflection layer 137 may be disposed on the unit support surface 135 and configured to reflect light. Specifically, the unit reflection layer 137 may support the side surface of the light converter 120 and may be configured to reflect light incident toward the side surface of the light converter 120 to improve the light concentration efficiency of light emitted from the light source 110 to the light guide plate 40. The unit reflection layer 137 may be integrally formed with the unit support surface 135 of the package housing 130 or may be provided separately from the unit support surface 135 and adhered to the unit support surface 135. Further, the unit support surface 135 may be formed of a reflective material to serve as the unit reflection layer 137.

The reflection layer 132 may be integrally formed with a body of the package housing 130 or may be separately formed and adhered to the body of the package housing 130. In addition, the package housing 130 may be formed of a reflective material such that the inner surface of the package housing 130 may be formed of the reflection layer 132.

The unit reflection layer 137 may have a flat surface. The side surface of the light converter 120 may be formed in a flat surface, and the unit reflection layer 137 in contact with the flat surface of the light converter 120 may be formed in a flat surface. The unit reflection layer 137 may be formed in a direction parallel to an imaginary center line C connecting the centers of the light source 110 and the light guide plate 40. That is, as shown in the cross-sectional view of the light source package 100 of FIG. 5, the unit reflection layer 137 may extend in a direction parallel to the center line C. In addition, in an example embodiment, the unit reflection layer 137 may be formed to have four surfaces in contact with and corresponding to four side surfaces of the hexahedron-shaped light converter 120. However, embodiments are not limited thereto. For example, at least a portion of the unit reflection layer 137 may be formed as a curved surface. Further, the light converter 120 may have a polygonal shape on the first surface and the second surface, and the unit reflection layer 137 may be formed to have flat surfaces corresponding to a plurality of flat surfaces connecting the first polygonal surface and the second polygonal surface.

With this configuration, light emitted from the light source 110 or light reflected by the light converter 120 and directed to the unit reflection layer 137 may be reflected toward the light guide plate 40.

The display apparatus 1 may include a heat sink 140. The heat sink 140 may be disposed on the PCB 35 to absorb and dissipate heat generated by the PCB 35, the light source 110 and/or the light converter 120.

Hereinafter, a display device according to an example embodiment will be described. A detailed description of the same configuration as that described above will be omitted.

Figure 6:
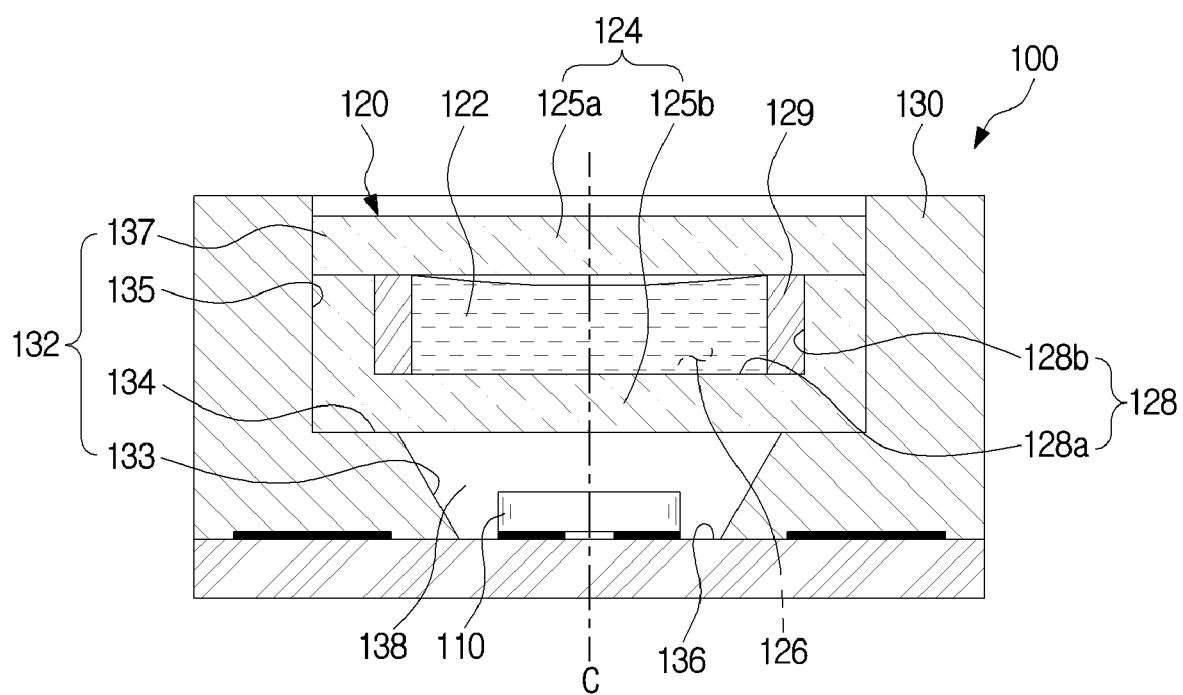
FIG. 6 is a cross-sectional view of a light source package of a display device according to an example embodiment.

FIG. 6 is a cross-sectional view of a light source package of a display device according to an example embodiment.

A light converter 120 may include a quantum dot (QD) 122 and a unit body 124 surrounding the quantum dot 122. The unit body 124 may include first body 125a and a second body 125b.

The light converter 120 may include a QD reflection layer 129 disposed on an inner wall 128 of the unit body 124.

The inner wall 128 of the unit body 124 may include a first inner wall 128a opposite to the light source 110 and a second inner wall 128b extending from the first inner wall 128a toward the light guide plate to form a depth of the receiving portion 126. The QD reflection layer 129 may be disposed on the second inner wall 128b to reflect light incident toward the quantum dot 122 or reflect light reflected by the quantum dot 122 and propagating to the periphery of the light guide plate 40, to improve the light concentration efficiency of the light source package 100.

Hereinafter, a display device according to an example embodiment disclosure will be described. A detailed description of the same configuration as that described above will be omitted.

Figure 7:
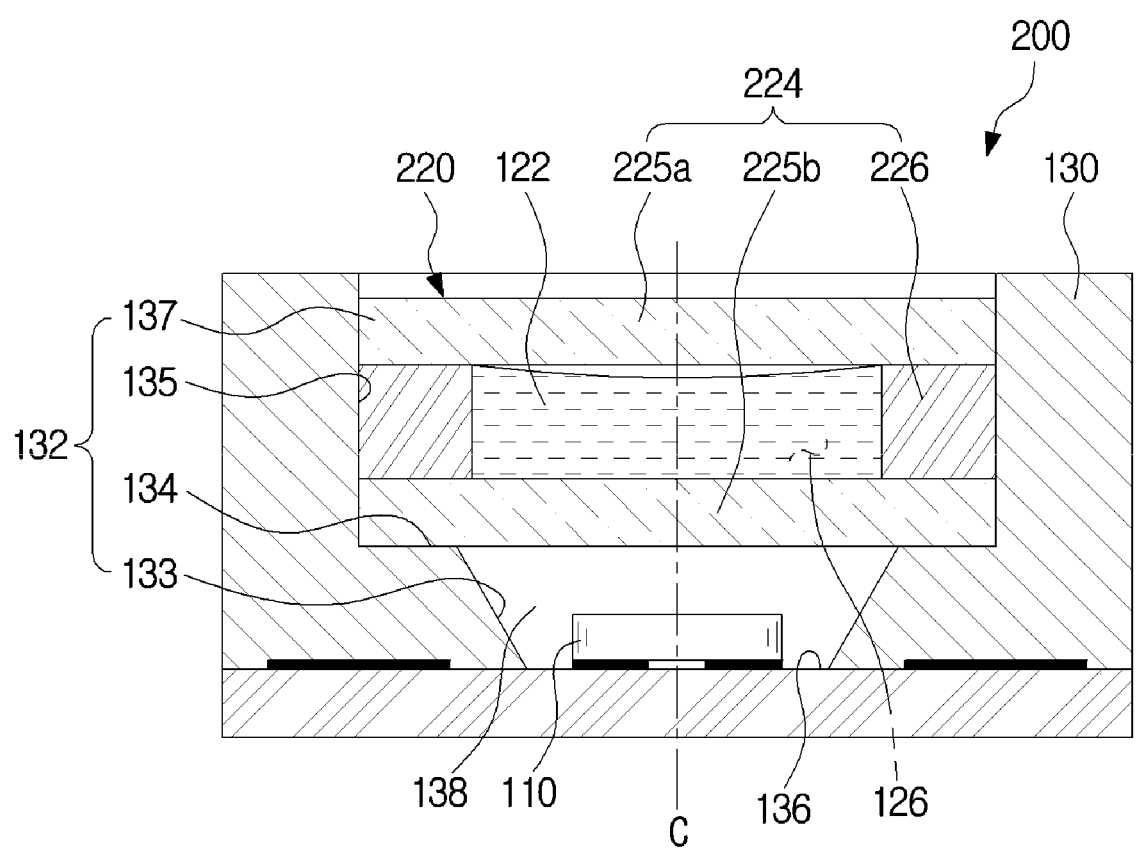
FIG. 7 is a cross-sectional view of a light source package of a display device according to an example embodiment.

FIG. 7 is a cross-sectional view of a light source package of a display device according to an example embodiment.

A light source package 200 may include a light converter 220.

The light converter 220 may include a quantum dot (QD) 122 and a unit body 224 surrounding the quantum dot 122.

The unit body 224 may include a receiving portion 126 formed therein and the quantum dot 122 may be disposed in the receiving portion 126. The receiving portion 126 of the unit body 224 may be formed to be hermetically closed, and the quantum dot 122 may be disposed in the closed space. Such configuration may reduce or prevent the quantum dot 122 from being exposed to the external environment, and thereby, reducing or preventing the quantum dot 122 from being oxidized or deformed by moisture.

The unit body 224 may be formed of a light transmissive material to transmit light.

The unit body 224 may include a first body 225a, a second body 225b spaced apart from the first body 225a, and a reflective body 226 connecting the first body 225a and the second body 225b. The reflective body 226 may connect the first and second bodies 225a and 225b and may be in close contact with or bonded to the first and second bodies 225a and 225b to seal the receiving portion 126. The distance between the first body 225a and the second body 225b corresponds to the depth of the receiving portion 126 and the lengths of the inner surfaces of the reflective body 226 may form the width and length of the receiving portion 126.

The reflective body 226 may be configured to seal the quantum dot 122 and to reflect light passing through the quantum dot 122 and propagating to the periphery of the light guide plate 40, to direct light to the light guide plate 40. The reflective body 226 may be configured such that an outer surface of the reflective body 226 is capable of reflecting light to improve the light concentration efficiency of the light source package 100.

Hereinafter, a display device according to an example embodiment will be described. A detailed description of the same configuration as that described above will be omitted.

Figure 8:
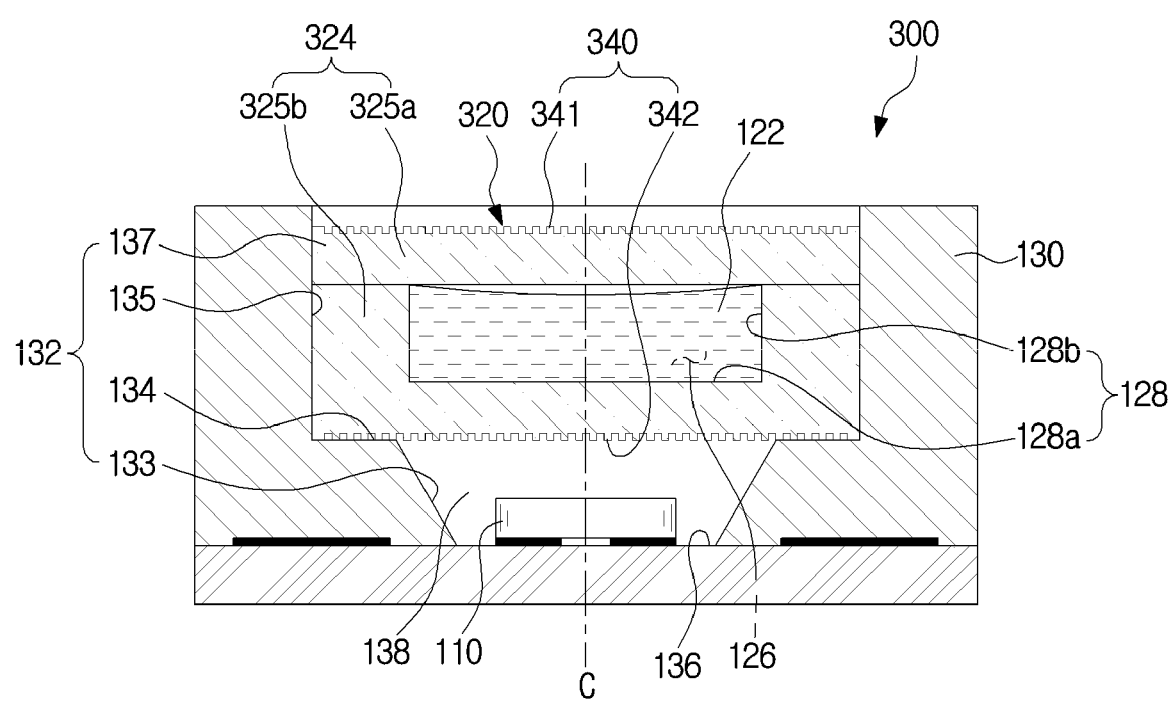
FIG. 8 is a cross-sectional view of a light source package of a display device according to an example embodiment.

FIG. 8 is a cross-sectional view of a light source package of a display device according to an example embodiment.

A light source package 300 may include a light converter 320.

The light converter 320 may include a quantum dot 122 and a unit body 324 surrounding the quantum dot 122. The unit body may include a first body 325a and a second body 325b.

An outer surface of the unit body 324 may include an uneven surface 340.

The uneven surface 340 is configured to prevent or reduce light that is incident on or emitted from the light converter 320 from being totally reflected on the surface of the light converter 320.

The uneven surface 340 in the unit body 324 may include a first uneven surface 341 facing the light guide plate 40 and a second uneven surface 342 facing the light source 110. The first uneven surface 341 may be formed on the first body 325a and the second uneven surface 342 may be formed on the second body 325b, as shown in FIG. 8. However embodiments are not limited thereto. For example, one of the first and second uneven surfaces 341 and 342 may be formed on one of the first and second bodies 325a and 325b, respectively.

Hereinafter, a display device according to an example embodiment will be described. A detailed description of the same configuration as that described above will be omitted.

Figure 9:
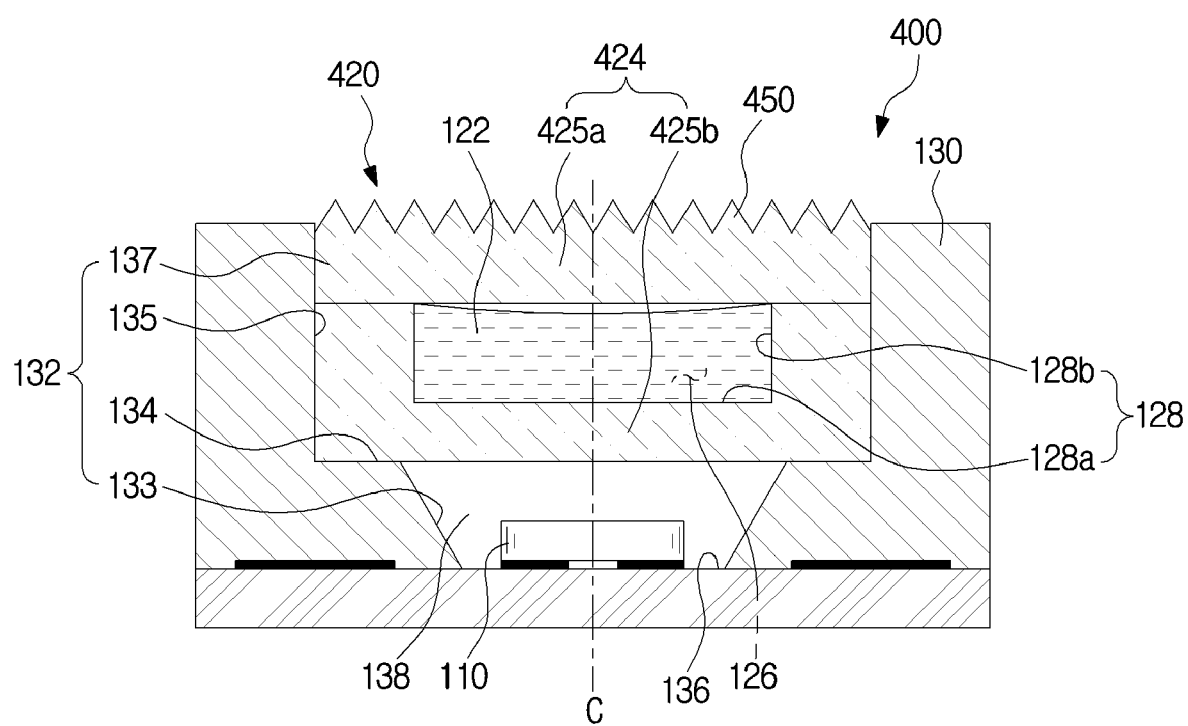
FIG. 9 is a cross-sectional view of a light source package of a display device according to an example embodiment.

FIG. 9 is a cross-sectional view of a light source package of a display device according to an example embodiment.

A light source package 400 may include a light converter 420.

The light converter 420 may include a prism 450.

The prism 450 may be formed on an outer surface of a unit body 424. For example, the prism 450 may be disposed on an outer surface of the unit body 424 facing the light guide plate 40. However, embodiments are not limited thereto. For example, the prism 450 may be disposed on an outer surface of the unit body 424 opposite to the light source 110.

The prism 450 may be formed of a transmissive material, and may be configured to refract, reflect, or disperse light incident on the light converter 420, and to direct light to the light guide plate 40.

In an example embodiment, the prism 450 may be formed to have a triangular shape, but the shape of the prism 450 is not limited thereto. For example, the prism 450 may be formed with a pattern, or may be formed with a plurality of patterns. The prism 450 may be formed of a transmissive material to transmit light.

Hereinafter, a display device according to an example embodiment will be described. A detailed description of the same configuration as that described above will be omitted.

Figure 10:
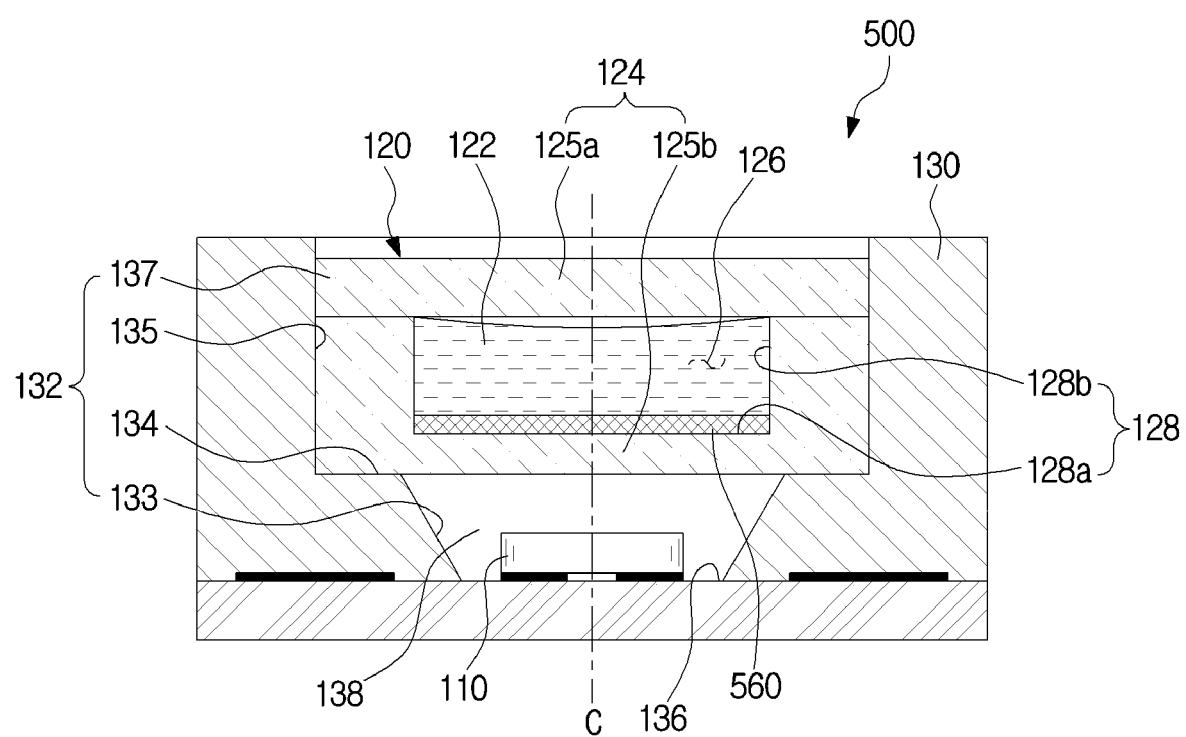
FIG. 10 is a cross-sectional view of a light source package of a display device according to an example embodiment.

FIG. 10 is a cross-sectional view of a light source package of a display device according to an example embodiment.

A light source package 500 may include a light converter 120.

The light converter 120 may include a quantum dot (QD) and a unit body 124 surrounding the quantum dot. The unit body 124 may include a first body 125a and a second body 125b.

An inner wall 128 of the unit body 124 includes a first inner wall 128a opposite to the light source 110 and a second inner wall 128b extending from the first inner wall 128a toward the light guide plate 40, and forming a depth of the receiving portion 126.

The light converter 120 may include a dichroic filter 560.

The dichroic filter 560 is configured to transmit light of a shorter wavelength and to reflect light of a longer wavelength. The dichroic filter 560 may be disposed on the first inner wall 128a or the first and second inner walls 128a and 128b.

Light emitted from the light source 110 may reach a quantum dot 122 by passing through the dichroic filter 560. However, light having a longer wavelength while being reflected by the dichroic filter 560 may not pass through the dichroic filter 560 to reach the quantum dot 122. The dichroic filter 560 may be configured to focus the direction of light emitted from the light source package 100 and improve the light concentration efficiency.

According to example embodiments, a display device including light source package including a quantum dot and a light source may improve color reproducibility of the display device.

According to example embodiments, the light concentration efficiency of a light source package including a light converter and being surrounded by a package housing.

Example embodiments have been shown and described above. However, the exemplary embodiments are not limited thereto. Those skilled in the art may modify the example embodiments without departing from the gist and scope of the present disclosure as described by the appended claims, and their equivalents.

What is claimed is:

1. A display device comprising:
   a display panel;
   at least one light source package configured to emit light; and
   a light guide plate configured to receive the light emitted by the at least one light source package and guide the light toward the display panel,
   wherein the at least one light source package comprises:
      a light source configured to emit the light;
      a light converter disposed between the light source and the light guide plate, and configured to convert one or more properties of the light emitted by the light source, the light converter comprising a first surface on which the light emitted by the light source is incident and a second surface opposite to the first surface and from which the light incident on the first surface is emitted toward the light guide plate;
      a package housing in which the light source is disposed and comprising one side with an opening in which the light converter is disposed, the package housing comprising a unit support surface configured to support a side surface of the light converter connecting the first surface and the second surface of the light converter, and
      a unit reflection layer configured to reflect light and disposed between the side surface of the light converter and the unit support surface of the package housing,
   wherein the light converter comprises:
      a quantum dot;
      a unit body configured to transmit light and comprising an inner wall to form a receiving portion in which the quantum dot is disposed and sealed; and
      a quantum dot reflection layer disposed along the inner wall of the unit body and configured to reflect at least one of the light emitted by the light source and light reflected from the quantum dot.

2. The display device according to claim 1, wherein the unit reflection layer is integrally formed with at least one of the light converter and the package housing.

3. The display device according to claim 1, wherein the unit body further comprises:
   a first body;
   a second body spaced apart from the first body; and
   a reflective body configured to be in contact with the first body and the second body and disposed between the first body and the second body to form the receiving portion, the reflective body comprising an outer surface configured to reflect light.

4. The display device according to claim 1, wherein each of the side surface of the light converter and the unit support surface comprise a flat surface parallel to a direction normal to a surface of the light guide plate.

5. The display device according to claim 1, wherein the package housing further comprises a seat surface extending from the unit support surface and on which at least a portion of the first surface of the light converter is disposed.

6. The display device according to claim 5, wherein the package housing further comprises a reflecting cup portion connected to the seat surface, disposed at an angle from an inner surface of the package housing, and configured to reflect the light emitted from the light source.

7. The display device according to claim 1, wherein at least one of the first surface and the second surface of the light converter is an uneven surface configured to reduce reflection of light.

8. The display device according to claim 1, wherein the at least one light source package further comprises a prism disposed on one of the first surface and the second surface of the light converter, and configured to concentrate the light emitted from the light source toward the light guide plate.

9. The display device according to claim 1, wherein the at least one light source package further comprises a dichroic filter disposed on the first surface of the light converter and configured to reflect light, reflected toward the light source by the light converter, toward the light guide plate.

10. A display device comprising:
    a display panel;
    a light source package configured to emit light; and
    a light guide plate configured to receive the light emitted by the light source package and configured to guide the light toward the display panel,
    wherein the light source package comprises:
       a package housing comprising one side with an opening opposite to the light guide plate;
       a light source disposed inside the package housing and configured to emit the light;
       a light converter configured to convert one or more properties of the light emitted from the light source, the light converter comprising a first surface on which the light emitted by the light source is incident, a second surface opposite to the light guide plate and exposed to the light guide plate through the opening of the package housing, and a side surface connecting the first surface and the second surface; and
       a unit reflection layer configured to reflect light and disposed between the side surface of the light converter and an inner surface of the package housing
    wherein the light converter comprises:
       a quantum dot, and a unit body comprising an inner wall configured to form a receiving portion in which the quantum dot, configured to be light transmissible, is disposed and sealed, and
    wherein the light source package further comprises:
       a quantum dot reflection layer disposed along the inner wall of the unit body and configured to reflect at least one of the light emitted from the light source and light reflected from the quantum dot.

11. The display device according to claim 10, wherein the package housing comprises a unit support surface configured to support the side surface of the light converter.

12. The display device according to claim 11, wherein the unit reflection layer is integrally formed with at least one of the light converter and the package housing.

13. The display device according to claim 10, wherein the unit body further comprises:
  a first body; and
  a second body spaced apart from the first body,
  wherein the quantum dot reflection layer is in contact with the first body and the second body and disposed between the first body and the second body to form the receiving portion, the quantum dot reflection layer comprising an outer surface configured to reflect light.

14. A display device comprising:
  a display panel;
  a light source package configured to emit light; and
  a light guide plate to receive the light emitted by the light source package and transmit the light to the display panel,
  wherein the light source package comprises:
    a light source configured to emit the light;
    a light converter disposed between the light source and the light guide plate to convert one or more properties of the light emitted by the light source;
    a package housing in which the light source and the light converter are disposed; and
    a reflection layer disposed between a side surface of the light converter and an inner surface of the package housing and configured to reflect light, and
  wherein the light converter comprises:
    a quantum dot; and
    a unit body configured to transmit light and comprising an inner wall to form a receiving portion in which the quantum dot is disposed and sealed, and
  wherein the light source package further comprises:
    a quantum dot reflection layer disposed along the inner wall of the unit body and configured to reflect at least one of the light emitted by the light source and light reflected from the quantum dot.

15. The display device according to claim 14, wherein the reflection layer is integrally formed with at least one of the light converter and the package housing.

* * * * *